United States Patent [19]
Johnson

[11] 4,063,239
[45] Dec. 13, 1977

[54] RANGE OR DOPPLER GATE DECEPTION REJECTION SYSTEM

[76] Inventor: Robert H. Johnson, 11833 N. 64th St., Scottsdale, Ariz. 85257

[21] Appl. No.: 720,925

[22] Filed: Sept. 7, 1976

[51] Int. Cl.² .............................. G01S 9/44; G01S 7/36
[52] U.S. Cl. .............................. 343/8; 343/7.3; 343/7.7; 343/17.7; 343/18 E
[58] Field of Search ................. 343/7.7, 8, 17.7, 18 E, 343/7.3

[56] References Cited

U.S. PATENT DOCUMENTS

| 3,056,128 | 9/1962 | Ball et al. | 343/7.3 |
| 3,950,751 | 4/1976 | Orr et al. | 343/18 E |

Primary Examiner—S. C. Buczinski
Attorney, Agent, or Firm—Eugene A. Parsons

[57] ABSTRACT

A doppler radar wherein the range signal is differentiated to obtain a range rate of change and a velocity signal is obtained from the doppler frequency shift of signals returned from a target, and wherein the range rate and velocity signals are compared and, if the difference exceeds a predetermined amount, the range and doppler or velocity circuits are reset.

6 Claims, 1 Drawing Figure

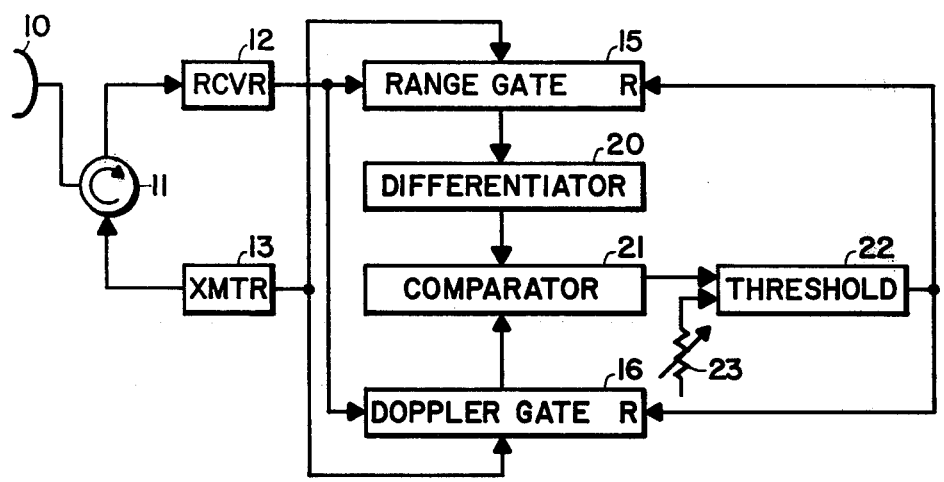

RANGE OR DOPPLER GATE DECEPTION REJECTION SYSTEM

BACKGROUND OF THE INVENTION

Doppler radars, such as those used in active radar guided missiles and the like, are highly vulnerable to deception jamming systems, which systems send signals to the radar receiver which appear to be return signals from a target. If these apparent targets or deception signals cannot be differentiated from true target return signals the target may slip away virtually undetected. Generally, the jamming signal is swept through a range of frequencies to simulate a moving target which the doppler radar will detect and instruct the guided missile or the like to follow. Some semiactive guided missiles and radars sense excessive acceleration in return signals and reject them as deception jamming signals. However, if the deception jamming signals are swept relatively slowly, these prior art radars cannot detect the signals as deception jamming signals.

SUMMARY OF THE INVENTION

The present invention pertains to a range or doppler deception rejection system for use with a doppler radar wherein range signals are differentiated to provide a range rate signal indicative of the rate of change of the range and a velocity signal is provided from the doppler frequency shift of signals returned from the target, the range rate signal and the velocity signal are then compared to determine if they are compatible and, if they are not, the range and velocity circuits are reset to search for a different return signal.

It is an object of the present invention to provide a new and improved range or doppler deception rejection system.

It is a further object of the present invention to provide a range or doppler deception rejection system which senses incompatibility of range rate and velocity (doppler shift) signals and resets the radar to search for a different target return if incompatibility is present.

These and other objects of this invention will become apparent to those skilled in the art upon consideration of the accompanying specification, claims and drawing.

BRIEF DESCRIPTION OF THE DRAWING

The single FIGURE is a simplified block diagram of a doppler radar including a deception rejection system embodying the present invention.

DESCRIPTION OF THE PREFERRED EMBODIMENT

Referring to the drawing, the numeral 10 designates an antenna which is electrically connected through a circulator 11 to a receiver 12 and transmitter 13. The receiver 12 and transmitter 13 make up a doppler radar the operation of which is well known to those skilled in the art and will not be elaborated upon in this specification. The transmitter 13 is connected to supply timing and frequency reference signals to a range gate 15 and a doppler gate 16. The receiver 12 supplies signals to the range gate 15 indicative of pulses returned from a target. These pulses may be reflected, reradiated, etc. and, by measuring the time between a transmitted pulse radiated from the transmitter 13 and the return pulse from a target, provide an indication of the range of the target in a manner well known to those skilled in the art. This signal indicative of the relative range between the radar and the target is available at the output of the range gate 15. The range gate 15 is a circuit, well known to those skilled in the art, which is positioned at a predetermined range setting or which periodically sweeps through a predetermined range until a target is acquired, at which time the gate 15 tracks the target to provide an indication of the changing range of the target. A reset input, labeled R, when properly energized, causes the range gate 15 to return to the predetermined range, or reinstitute the sweeping action until a new target is acquired. The doppler gate 16 operates similar to the range gate 15 except that it acts on doppler frequency shift signals to provide an output signal indicative of the relative velocity between the target and the radar. The doppler gate 16 has a reset input, labeled R, which resets the doppler gate to a predetermined velocity or reinstitutes sweeping action until a new target is acquired.

The range and doppler gates 15 and 16 may include standard servo loop type gates or may include apparatus similar to that described in the co-pending application entitled "Range Tracking Apparatus in a Doppler Radar", Ser. No. 686,429, filed May 14, 1976 and assigned to the same assignee.

The range information or signals from the range gate 15 are applied to a differentiator 20 to obtain range rate or velocity and the differentiated output thereof is applied to one input of a comparator 21. The doppler frequency shift velocity information from the doppler gate 16 is applied to a second input of the comparator 21. The comparator 21 measures the difference between the range rate from the differentiator 20 and the velocity from the doppler gate 16 and provides a signal at an output thereof indicative of the difference. The output from the comparator 21 is applied to one input of a threshold circuit 22, a second input of which receives a predetermined threshold voltage, signified by a variable resistor 23. If the output signal from the comparator 21 exceeds the predetermined threshold voltage, the threshold circuit 22 supplies an output signal to the reset inputs, R, of the range and doppler gates 15 and 16, respectively. The output signal from the threshold 22 resets the range and doppler gates 15 and 16, as previously described, which causes the gates to search for a new target.

Thus, a range or doppler deception rejection system is disclosed which compares the range rate of a target, as obtained from the timing of return signals in a well known manner, to the velocity of the same target, as obtained from the doppler frequency shift of the return signals. If the range rate and velocity are incompatible, i.e., not within a set value or threshold, then it is assumed that deception jamming signals are being received. Accordingly, reacquisition of the true target is initiated and the deception jamming signals are rejected. Because the system operates on both the timing and the doppler shift of returns from a target, it is capable of rejecting practically all deception jamming signals and reacquiring the actual target.

While I have shown and described a specific embodiment of this invention, further modifications and improvements may be devised by those skilled in the art. I desire it to be understood, therefore, that this invention is not limited to the particular form shown and I intend in the appended claims to cover all modifications which do not depart from the spirit and scope of this invention.

What is claimed is:

1. A range or doppler deception rejection system comprising:

a. a doppler radar transmitter and receiver;
b. range means connected to said receiver for receiving indications of signals returned from a target and for providing output signals indicative of the range from the system to the target;
c. differentiating means connected to receive the output signal from said range means and to differentiate the output signal to provide a range rate signal indicative of the rate of change of the output signal from said range means;
d. comparator means having first and second inputs and an output, the first input being connected to receive the range rate signal from said differentiating means;
e. doppler means connected to said receiver for determining the relative velocity between the target and the system from the doppler frequency shift of signals returned from the target;
f. the second input of said comparator means being connected to receive a signal indicative of the relative velocity from said doppler means; and
g. means coupling the output of said comparator means to said range means and said doppler means for resetting said range and doppler means when the output of said comparator means exceeds a predetermined amount.

2. A rejection system as claimed in claim 1 wherein the coupling means includes a threshold circuit for determining the predetermined amount.

3. A rejection system as claimed in claim 1 wherein the range means includes range gate circuitry for continuously tracking a target.

4. A rejection system as claimed in claim 1 wherein the doppler means includes doppler gate circuitry for continuously tracking a target.

5. In a doppler radar including a transmitter and a receiver for receiving signals returned from a target, a range or doppler deception rejection system comprising:
a. means providing a signal indicative of the rate of change of the range between the target and the radar;
b. means providing a signal indicative of the relative velocity between the target and the radar from the doppler frequency shift of signals returned from the target;
c. comparator means connected to receive the signal indicative of the rate of change and the signal indicative of the relative velocity and to provide an output indicative of the difference therebetween; and
d. means coupling the output of said comparator means to said rate of change providing means and said relative velocity providing means for the resetting thereof when the output of said comparator means exceeds a predetermined value.

6. In a doppler radar including a transmitter and a receiver, a method of rejecting range or doppler deception jamming comprising the steps of:
a. determining the range of a target from return signals in the receiver at a plurality of times;
b. differentiating the range to obtain a signal indicative of the rate of change of the range;
c. determining the relative velocity between the radar and the target from the doppler shift of the return signals in the receiver;
d. comparing the relative velocity to the rate of change of the range; and
e. resetting the receiver to acquire another target if the comparison between the relative velocity and the rate of change of the range exceeds a predetermined amount.

* * * * *